Jan. 13, 1942.   H. M. ULLSTRAND   2,269,701
REFRIGERATION
Filed April 7, 1938
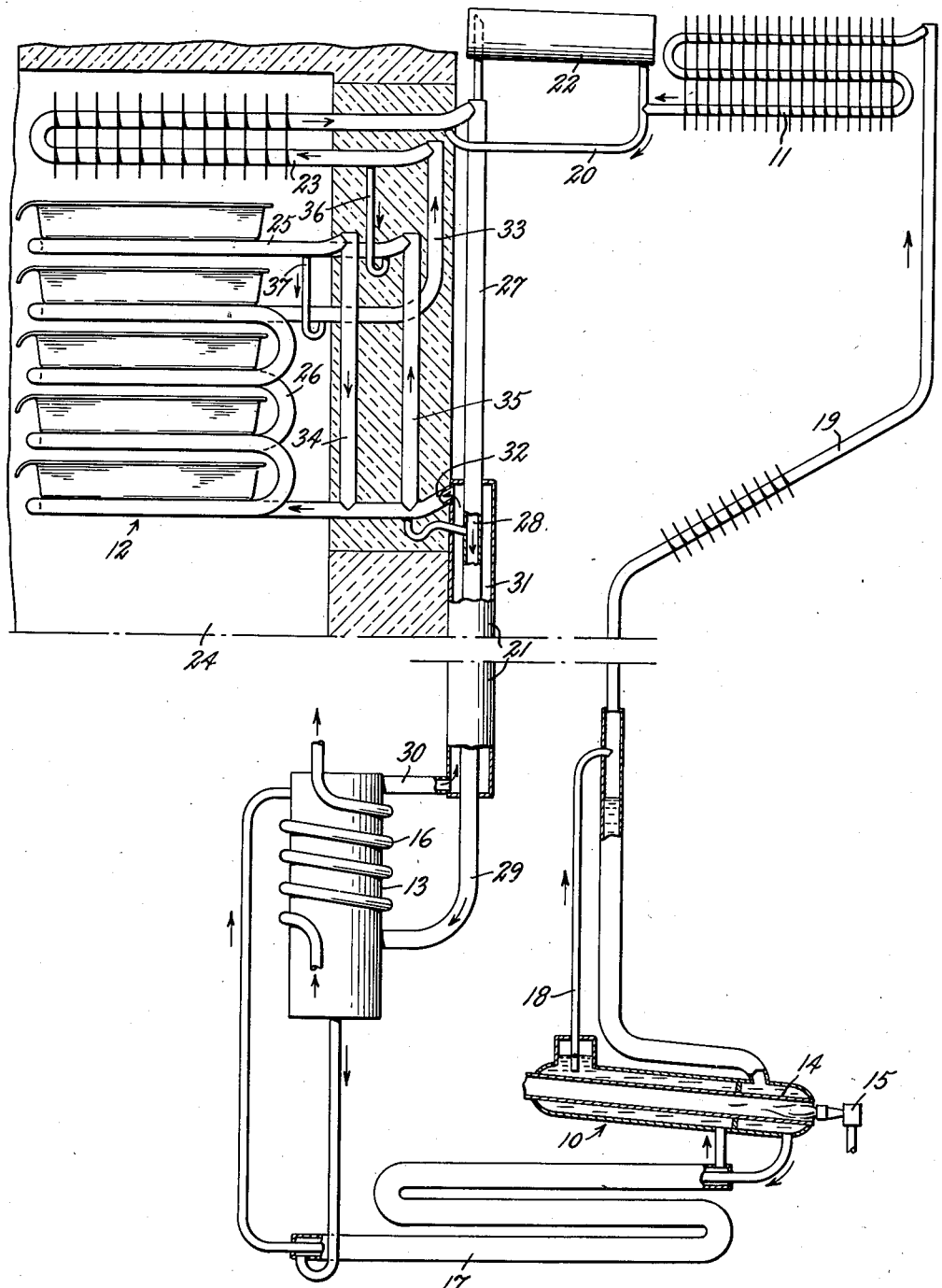
INVENTOR.
Hugo M. Ullstrand
BY D. E. Heath
his ATTORNEY.

Patented Jan. 13, 1942

2,269,701

UNITED STATES PATENT OFFICE 2,269,701

REFRIGERATION

Hugo M. Ullstrand, Evansville, Ind., assignor to Servel, Inc., New York, N. Y., a corporation of Delaware Application April 7, 1938, Serial No. 200,570

6 Claims. (Cl. 62—119.5)

My invention relates to refrigeration by evaporation and diffusion of refrigerant fluid in the presence of auxiliary fluid, and it is an object of the invention to obtain better use of cooling effect by improved flow of fluid in a refrigeration system containing auxiliary fluid as set forth, together with other objects and advantages, in the following description in connection with the accompanying drawing of which the single figure shows more or less diagrammatically a refrigeration system embodying the invention.

The refrigeration system includes a generator 10, a condenser 11, an evaporator 12, and an absorber 13. The generator 10 is provided with a flue 14 and is heated by a gas burner 15 arranged so that the flame is projected into the lower end of flue 14.

The absorber 13 is provided with a cooling coil 16 which may be connected to an air cooled condenser, forming therewith a vaporization-condensation heat transfer circuit for cooling of the absorber. The absorber may be directly air cooled. The generator 10 and absorber 13 are interconnected for circulation therethrough and therebetween of liquid by members including a liquid heat exchanger 17. Circulation of liquid is caused by a thermosyphon or vapor lift 18.

The generator 10 is connected to condenser 11 by a conduit 19 for flow of vapor from the generator to the condenser. The condenser 11 is connected to the upper part of evaporator 12 by a conduit 20 for flow of liquid from the condenser to the evaporator.

The evaporator 12 and absorber 13 are interconnected for circulation of gas therethrough and therebetween by members including a gas heat exchanger 21. The outlet end of the condenser 11 is connected to the gas circuit by members including a gas accumulation vessel 22.

The evaporator 12 is shown somewhat diagrammatically for the purpose of better illustration. There is an upper section comprising a pipe coil 23 provided with heat transfer fins for cooling of air in a refrigerator storage compartment 24 in which the evaporator 12 is located. An intermediate section of evaporator 12 is formed by a pipe coil 25. A lower evaporator section is formed by a pipe coil 26. The upper end of coil 23 is connected by a conduit 27, inner passage 28 of the heat exchanger 21, and conduit 29 to the lower part of the absorber 13. The upper part of absorber 13 is connected by a conduit 30, outer passage 31 of the gas heat exchanger, and conduit 32 to the lower end of the lower evaporator coil 26. The upper end of lower coil 26 is connected by a conduit 33 to the lower end of coil 23. Both ends of the intermediate coil 25 are connected by conduits 34 and 35 to conduit 32. One end of coil 25 could be connected to conduit 33 if desired. A conduit 36 connects the lower end of coil 23 to the upper end of coil 25 for downward flow of liquid from the upper coil to the lower coil. A conduit 37 connects the other end of coil 25 to the upper end of coil 26 for downward flow of liquid from the higher to the lower coil.

The system contains refrigerant fluid, a liquid absorbent therefor, and inert auxiliary gas. These fluids may be ammonia, water, and hydrogen, respectively. In operation, the burner 15 heats generator 10 and ammonia vapor is expelled from solution. The vapor condenses to liquid in condenser 11. The liquid ammonia evaporates and diffuses into hydrogen in evaporator 12. Ammonia vapor is absorbed out of hydrogen into solution in absorber 13. The burner 15 may be controlled by a thermostatic valve, not shown, responsive to temperature of evaporator 12. Other suitable means may be used for heating the generator.

Liquid ammonia flowing from condenser 11 through conduit 20 enters the upper end of coil 23. The liquid flows through coil 23 and then through conduit 36 into coil 25. The liquid flows through coil 25 and then through conduit 37 into the upper end of coil 26. The liquid flows downward in coil 26.

Weak gas flows through conduit 32 into the lower end of coil 26. The gas flows upward in coil 26, conduit 33, and coil 23. The gas flows upward in coils 26 and 23 in counterflow to descending liquid. Gas flows to and from conduit 32 through coil 25 by way of conduits 35 and 34. In the several evaporator coils, the liquid ammonia evaporates and diffuses into the hydrogen, producing a refrigerating effect. The temperature at which evaporation of liquid ammonia occurs is a function of the partial pressure of ammonia vapor in the presence of the liquid. The higher the partial pressure of the vapor, the higher the evaporating temperature. Since gas flows first through coil 26 and then through coil 23, coil 26 will be at a lower temperature than coil 23.

Intermediate coil 25 also receives weak gas through conduit 35 so that the temperature of coil 25 will be as low as the temperature of the lower part of coil 26 when both contain liquid. However, if unevaporated liquid should not be reaching the lower part of coil 26, as for instance may occur when a heavy load is placed on the evaporator in a high temperature room, coil 25 will be at a lower temperature. The coils 26 and 25 are used principally for freezing of water into ice, and the placing of a heavy load on this part of the evaporator may be occasioned by inserting trays of water to be frozen. Coil 25 being in an intermediate part of the evaporator with respect to the downward flow of liquid therethrough, will be sure to receive liquid which has been pre-cooled in the high temperature section 23. Since it also receives weak gas, there is provided a fast freezing evaporator section.

The several evaporator sections are in series with respect to downward flow of liquid therethrough. The high temperature section 23 and the lower coil 26 are in series with respect to upward flow of inert gas therethrough. But the intermediate coil 25 receives gas in parallel with coil 26. With the connections to coil 25 made as shown in the drawing and described, the partial pressure of ammonia in the bottom of coil 26 will be somewhat greater than that in coil 25 due to evaporation of ammonia in the latter. Circulation of gas in the general absorber-evaporator circuit and also in the local circuit which includes coil 25 is caused by difference in specific weights of the rich and weak gas columns.

Various changes and modifications may be made within the scope of the invention as set forth in the following claims.

What is claimed is:

1. A method of refrigeration which includes conducting liquid refrigerant fluid in a downward path of flow and flowing auxiliary fluid in the presence of liquid first in an intermediate part of said path of flow and then counter-current to the liquid in the remaining parts of said path of flow.

2. An evaporator for a refrigeration system including an upper section, an intermediate section, a lower section, connections for flow of liquid downward through said sections respectively, connections for flow of gas to said lower and intermediate sections in parallel, and connections made so that gas flows from both said lower and intermediate sections to said upper section.

3. A method of refrigeration which includes conducting liquid refrigerant in a downward path of flow, conducting auxiliary fluid into the presence of the descending liquid first in a lower part of the path of flow and then in an upper part of the path of flow, and conducting other auxiliary fluid into the presence of liquid first in an intermediate part of said path of flow and subsequently in said upper part of the path of flow.

4. A method of refrigeration which includes conducting liquid refrigerant fluid in a downward path of flow and flowing auxiliary fluid in the presence of the liquid first at an intermediate part of said path of flow, then counter-current to the liquid at a lower part of said path of flow, and then counter-current to the liquid at the upper part of said path of flow.

5. In a refrigeration system, an evaporator having a path of flow for liquid downward therein, connections for admitting gas initially into the presence of liquid at a plurality of places in said downward path, and connections made so that gas from said places flows into the presence of liquid in said downward path above said places.

6. In a refrigeration system, a refrigerant liquefier, an absorber, an evaporator providing therein a downward path of flow for liquid from said refrigerant liquefier, said evaporator having inlet connections for admitting gas initially in the presence of liquid at a plurality of places in said downward path, and connections whereby gas from said places flows into the presence of the liquid in the upper end of said path above said places, said absorber being connected to said evaporator for flow of gas from the absorber to said inlet connections, and flow of gas from said upper end of the liquid path to the absorber.

HUGO M. ULLSTRAND.